R. P. FLOWER.
COMBINED SHIELD AND TAG BRACKET.
APPLICATION FILED MAR. 7, 1917.
1,244,306.
Patented Oct. 23, 1917.
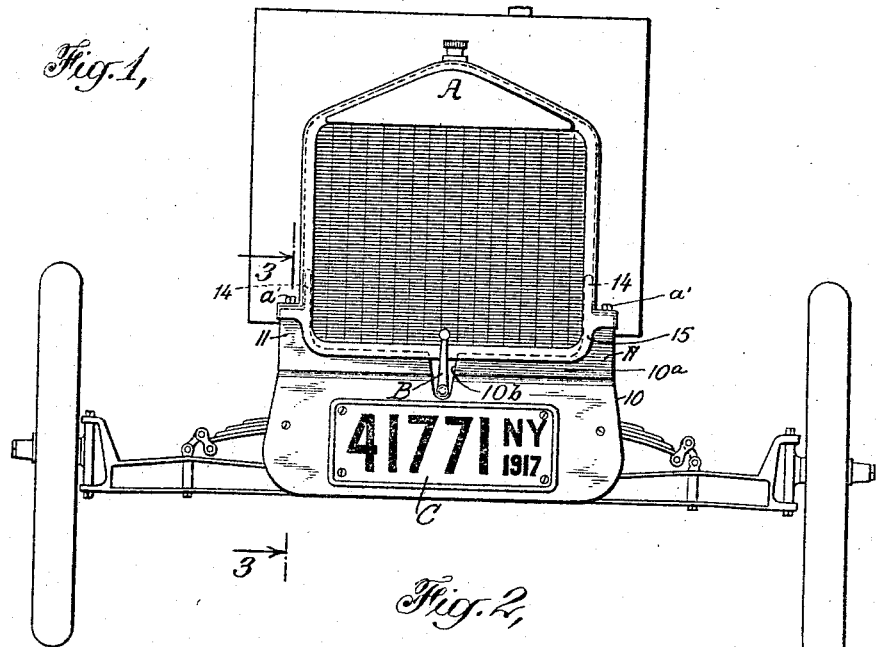
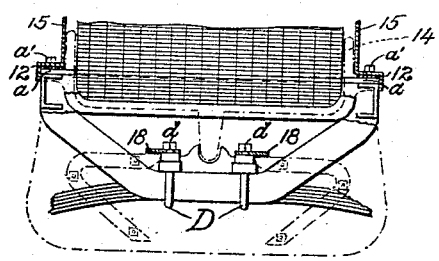
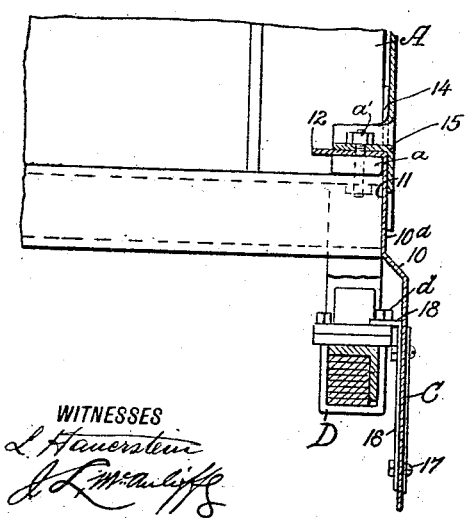
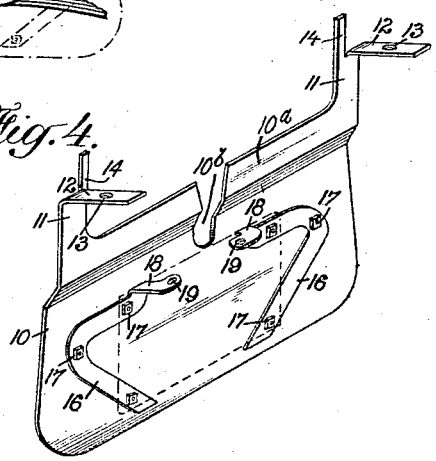
WITNESSES
INVENTOR
Roland P. Flower
BY
ATTORNEYS

UNITED STATES PATENT OFFICE.

ROLAND PHILIP FLOWER, OF MARSHALLTOWN, IOWA.

COMBINED SHIELD AND TAG-BRACKET.

1,244,306.  Specification of Letters Patent.  Patented Oct. 23, 1917.

Application filed March 7, 1917. Serial No. 153,131.

*To all whom it may concern:*

Be it known that I, ROLAND P. FLOWER, a citizen of the United States, and a resident of Marshalltown, in the county of Marshall and State of Iowa, have invented a new and Improved Combined Shield and Tag-Bracket, of which the following is a full, clear, and exact description.

My invention relates to means to hold a license tag bracket on an automobile at the front thereof, and has for its prime object to provide a combined shield and tag bracket adapted to be positioned on an automobile in front of the front spring thereof and below the radiator to improve the appearance of the automobile front.

A further important object of the invention is to provide means on the shield whereby to secure the same to the radiator brackets, and also to the front spring through the medium of the spring shackles.

In carrying out my invention, use is made of a sheet metal shield having thereon, at the back, brackets provided with members to be engaged by the U-bolts of the shackles of the front spring, the said brackets receiving bolts or the like passing through the shield and serving to secure the brackets in position and at the same time to secure the license tag in place on the shield. The shield is offset rearwardly at its upper portion so as to be properly positioned beneath the radiator of the automobile while the lower portion is in a plane to lie in front of the front spring, the offset upper portion being provided with novel means to engage the radiator brackets and be secured by the bolts of said radiator brackets.

The invention will be particularly explained in the specific description following.

Figure 1 is a front elevation of an automobile equipped with my combined shield and tag bracket;

Fig. 2 is a transverse vertical section taken through the members that engage the radiator brackets and the shackles of the front spring;

Fig. 3 is a detail longitudinal vertical section on the line 3—3, Fig. 1;

Fig. 4 is a rear perspective view of the combined shield and tag bracket.

In constructing a practical embodiment of my invention in accordance with the illustrated example, a shield designated generally by the numeral 10 is stamped from sheet metal of a desired shape and size to cover a substantial portion of the front spring of the automobile and to extend approximately to a line with the under side of the front axle. The upper portion $10^a$ of the shield 10 is offset rearwardly to lie approximately in the vertical plane of the front of the radiator A, and said offset portion is formed at the ends with upwardly extending members 11 that constitute hangers for suspending the shield on the brackets $a$ of the radiator. Said hangers are provided with top members 12 extending rearwardly at a right angle or approximately so, and formed with bolt holes 13 to receive the bolts $a'$ of the brackets $a$. In addition to the top members 12, the hangers 11 are formed with narrow upstanding members 14 which are continuous with the hangers and positioned to lie beneath the front of the radiator shell 15, inward from the brackets $a$ and these materially assist in positioning and steadying the shield. The radiator shown is that type of Ford automobile having the radiator shell removable.

The offset portion $10^a$ is formed with a notch $10^b$ for the accommodation of the crank shaft B.

The major portion of the shield 10 lies in front of and covers the major portion of the front spring and axle, and is adapted to carry the license tag C. In order to secure the shield to the axle, brackets 16 are provided, preferably approximately V-shape and disposed toward each other, this form serving to strengthen the shield, and said brackets 16 are secured by bolts, 17, which also serve to detachably secure the license tag. On the upper ends of the brackets rearwardly extending members 18 are formed, the ends thereof being broadened and provided with bolt holes 19 to receive the U-bolts D of the axle clips or shackles so that the nuts $d$ of said U-bolts serve to fasten the shield in addition to the fastening to the radiator brackets $a$.

By the described arrangement the appearance of the automobile is very much improved, the shield is firmly secured and braced, and the license tag is properly displayed.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A combined shield and license tag bracket, including a sheet metal shield adapted to receive the license tag, and offset rearwardly at its upper portion, means on the said offset portion whereby to secure the shield to the radiator brackets of an automobile, and means on the shield at the back below the first means whereby to secure the shield to the front axle of the automobile.

2. A combined shield and license tag bracket, including a sheet metal shield adapted to be positioned in front of the front spring of an automobile, means on the shield to secure a license tag thereto, hangers extending upwardly from the top of the said shield at the ends, said hangers being provided with rearwardly extending members to engage the radiator brackets of the automobile, and rearwardly extending means on the shield below said hangers whereby to secure the shield to the front spring.

3. A combined shield and license tag bracket, comprising a sheet metal shield having thereon at each end upwardly extending hangers spaced to accommodate a radiator, said hangers having rearwardly extending members adapted to seat on the radiator brackets and be secured thereto, so that the shield will hang below the radiator in front of the front spring and axle, additional members on said hangers extending upwardly beyond the first members to lie beneath a radiator shell at the front, and means on the shield to secure a license tag thereto.

4. A combined shield and license tag for automobiles, including a sheet metal shield adapted to receive a license tag and be positioned on an automobile below the radiator and in front of the front spring, means on the shield at the top at each end whereby to secure the shield to the radiator brackets of the automobile, and means on the shield at the back below the first means whereby to secure the shield on an automobile.

ROLAND PHILIP FLOWER.